(12) United States Patent
Stiner et al.

(10) Patent No.: US 6,305,627 B1
(45) Date of Patent: Oct. 23, 2001

(54) FASTENER AND RETAINER

(76) Inventors: Roy E. Stiner, 6142 S. Lakewood, Tulsa, OK (US) 74136; Saburo Nose, 170-51 Shimonajo, Ueda, Nagano, 388-11 (JP); Robert D. Bagby, 7770 Eagle Dr., Bixby, OK (US) 74008

( * ) Notice: Subject to any disclaimer, the term of this patent is extended or adjusted under 35 U.S.C. 154(b) by 0 days.

(21) Appl. No.: 09/456,774

(22) Filed: Dec. 8, 1999

(51) Int. Cl.$^7$ ................................................. A01K 89/00
(52) U.S. Cl. .......................... 242/283; 242/319; 74/545; 411/120; 411/121; 411/373; 24/113 MP
(58) Field of Search .................................... 242/282, 283, 242/284, 319; 74/544, 545, 546; 411/120, 121, 373, 431; 24/113 MP

(56) References Cited

U.S. PATENT DOCUMENTS

| | | | |
|---|---|---|---|
| 718,744 | * 1/1903 | White .................................... | 411/431 |
| 2,162,173 | * 6/1939 | Huntington, Jr. ..................... | 242/284 |
| 2,551,834 | * 5/1951 | Ferguson .............................. | 411/373 |
| 4,582,462 | * 4/1986 | Thiel ..................................... | 411/373 |
| 4,659,273 | * 4/1987 | Dudley .................................. | 411/373 |
| 4,905,930 | 3/1990 | Puryear et al. . | |
| 4,941,234 | * 7/1990 | Watanabe et al. .................. | 24/113 MP |
| 5,082,409 | 1/1992 | Bias . | |
| 5,093,965 | * 3/1992 | Mauras et al. ...................... | 24/113 MP |
| 5,149,008 | 9/1992 | Oi . | |
| 5,302,069 | * 4/1994 | Toth et al. ........................... | 411/429 |
| 5,350,266 | * 9/1994 | Espey et al. ........................ | 411/431 |
| 5,489,070 | 2/1996 | Puryear et al. . | |
| 5,529,255 | * 6/1996 | Asano et al. ........................ | 242/283 |
| 5,644,820 | * 7/1997 | Ho ....................................... | 24/113 MP |
| 5,690,290 | 11/1997 | Asano et al. . | |
| 5,810,532 | * 9/1998 | Huang .................................. | 411/431 |
| 5,897,069 | 4/1999 | Brown et al. . | |
| 5,906,323 | 5/1999 | Morimoto et al. . | |
| 5,947,399 | * 9/1999 | Oh ........................................ | 242/282 |
| 6,029,922 | * 2/2000 | Kim et al. ........................... | 242/283 |
| 6,053,683 | * 4/2000 | Cabiran ............................... | 411/374 |
| 6,062,787 | * 5/2000 | Maddalena ......................... | 411/429 |

* cited by examiner

Primary Examiner—Emmanuel M. Marcelo
(74) Attorney, Agent, or Firm—Fellers, Snider, Blankenship, Bailey & Tippens, P.C.

(57) ABSTRACT

A fishing reel including a crank handle retained to a threaded end of a crankshaft by an attachment which comprises a nut for threadedly fixing the crank handle to the crank shaft, wherein one end of the nut has a hexagonal cross section and the other end includes an outward flare, and a plastic retainer for the nut comprising: a first inside cavity shaped to receive the hexagonal portion of the nut such that the nut is nonrotatably captivated relative to the retainer; a second inside compartment shaped to receive the outward flare of the nut such that when matably received, the retainer is secured to the nut; a pin protruding from the retainer to be received by a hole in the crank handle to prevent rotation of the retainer relative to the crank handle; and a smooth outside surface.

9 Claims, 5 Drawing Sheets

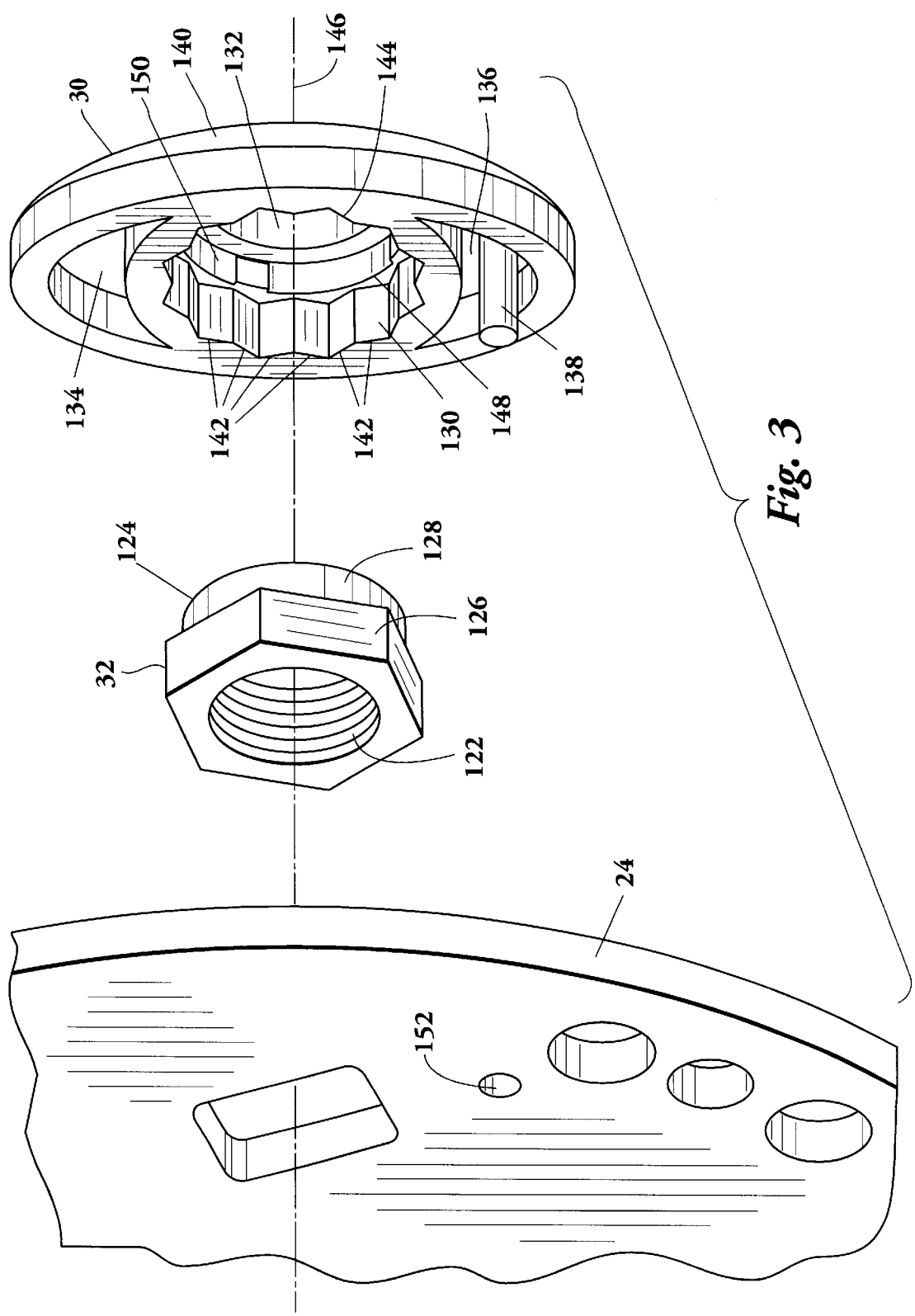

FASTENER AND RETAINER

BACKGROUND OF THE INVENTION

1. Field of the Invention

This invention relates generally to a threaded fastener and a mating retainer which prevents loosening of the threaded fastener due to rotation, and more specifically to a fishing reel in which a crank handle is rotatably affixed to the fishing reel and attached to the distal end of a crank shaft by a threaded fastener and a retainer.

2. Background

Fishing reels come in various types such as baitcasting fishing reels and spincasting fishing reels. Regardless of type, most fishing reels provide a crank handle which can be used to rotate the line spool to facilitate rewinding of the fishing line. Typically the crank handle is attached with a threaded fastener such as a conventional nut. To prevent loosening of the nut during operation of the fishing reel, various retainers have been used to prevent rotation of the nut relative to the crank shaft and crank handle.

A limitation of conventional retainers has been that a second threaded fastener has been required to attach the retainer to the crank handle. This second fastener has typically been a small screw which is easily lost during reel maintenance and the tightening of which creates an extra manufacturing step.

Previous attempts have been made to alleviate this problem. For example Asano et al., U.S. Pat. No. 5,690,290 discloses two techniques for eliminating the second fastener. First, a retainer is disclosed which utilizes an interference press fit between a recess in the crank handle and the retainer. This eliminates the tightening of a second threaded fastener, thereby providing an advantage from the manufacturer's perspective. However, this technique makes disassembly during maintenance virtually impossible without damaging either the crank handle or the retainer. No means is provided to remove the retainer. The second technique which Asano discloses for eliminating the second fastener utilizes four chamfers which protrude through openings in the crank handle to secure the retainer to the crank handle. Disassembly of this fishing reel will require all four chamfers to be simultaneously placed in their respective release states before the retainer may be removed. This feat would be very difficult without employing a specially made tool.

A further limitation of conventional retainers has been that sharp inside corners in the outside surface have proven difficult to clean and therefore tend to collect contaminants.

Another limitation of conventional retainers has been that discontinuities in the exposed surfaces of the retainers have proven to be a source of line entanglement.

Thus it is an object of the present invention to provide an attachment which secures the crank handle to the crankshaft including a threaded fastener and a retainer to prevent loosening of the threaded fastener without the need for additional elements to secure the retainer.

It is another object of the present invention to provide a retainer which may be readily removed for disassembly of the fishing reel.

It is another object of the invention to provide a retainer which has a smooth outside surface to reduce collection of contaminants and to discourage line entanglement.

SUMMARY OF THE INVENTION

These and other objects are achieved in a fishing reel including a crank handle retained to a threaded end of a crankshaft by an attachment which comprises a nut for threadedly fixing the crank handle to the crank shaft, wherein one end of the nut has a hexagonal cross section and the other end includes an outward flare, and a plastic retainer for the nut comprising: a first inside cavity shaped to receive the hexagonal portion of the nut such that the nut is nonrotatably captivated relative to the retainer; a second inside compartment shaped to receive the outward flare of the nut such that when matably received, the retainer is secured to the nut; a pin protruding from the retainer to be received by a hole in the crank handle to prevent rotation of the retainer relative to the crank handle; and a smooth outside surface.

BRIEF DESCRIPTION OF THE DRAWINGS

FIG. 3 provides an exploded perspective view of the inventive fastener and retainer.

DETAILED DESCRIPTION OF THE PREFERRED EMBODIMENT

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for purpose of description and not of limitation.

Figure 5:
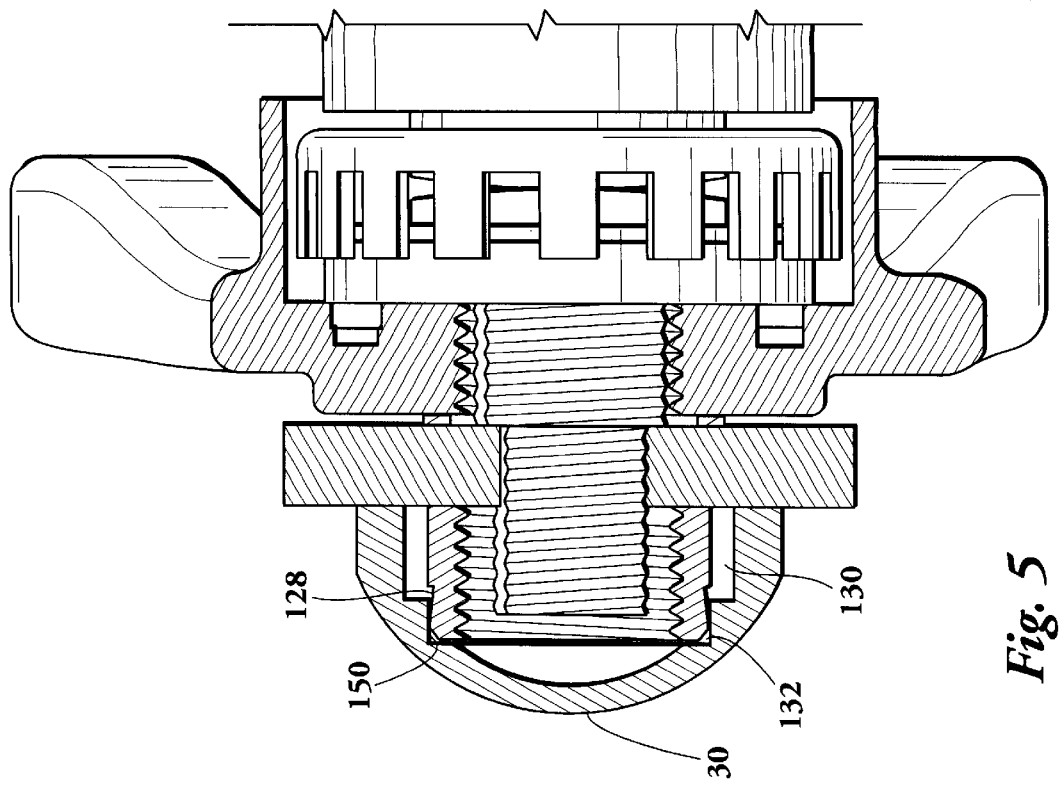
FIG. 5 provides a cutaway, elevational front view of inventive reel as seen from perspective 5—5.
Figure 1:
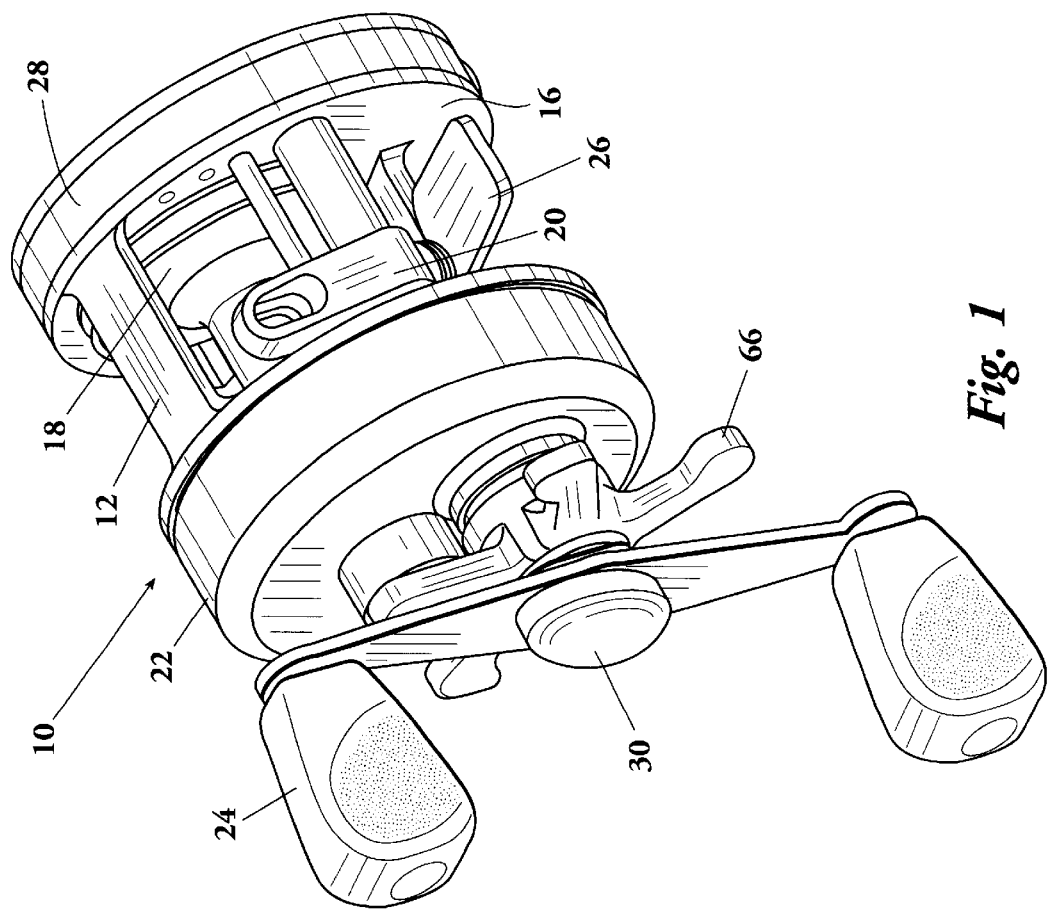
FIG. 1 provides a right side perspective view of an embodiment of the inventive reel.

Referring now to the drawings, wherein like reference numerals designate identical or corresponding parts throughout the several views, depicted in FIG. 1 there is shown the general environment of the invention including a baitcasting reel 10 incorporating a preferred embodiment of the inventive fastener and retainer apparatus. Baitcasting reel 10 is a round, right-handed reel preferably comprising: a frame 12 having a right side plate 14 and a left side plate 16; a line spool 18 rotatably mounted in frame 12 between side plates 14 and 16; a level-wind mechanism 20 which traverses the spool 18 during winding and guides the fishing line to ensure that the line is evenly wound along the entire length of the spool; a right side cover 22 secured over right side plate 14; a crank handle 24 operably extending from right side cover 22, for rotating spool 18; a reel foot 26 provided on the bottom of frame 12 for attaching reel 10 to a fishing rod; and a left side cover 28 secured over left side plate 16. When reel 10 is assembled, the only externally visible feature of the inventive fastener and retainer apparatus is outside surface of the retainer 30.

Although for convenience, the inventive apparatus is herein described as incorporated in a right-handed baitcasting reel, the inventive apparatus is equally adaptable for use in left-handed baitcasting reels, as well as other types of fishing reels.

Figure 2A:
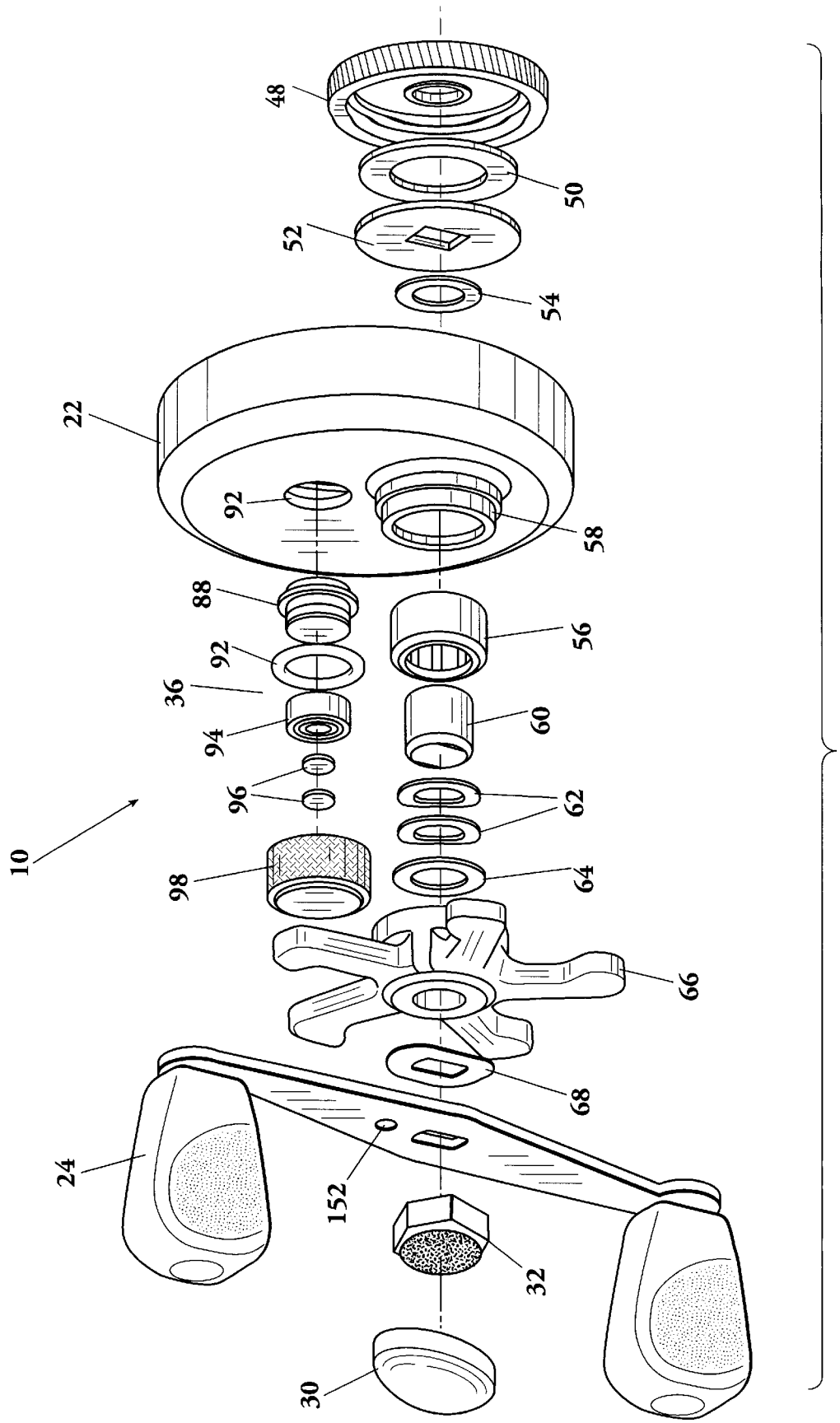
FIGS. 2A and 2B provide an exploded perspective view of the right side cover assembly of the inventive reel.
Figure 2B:
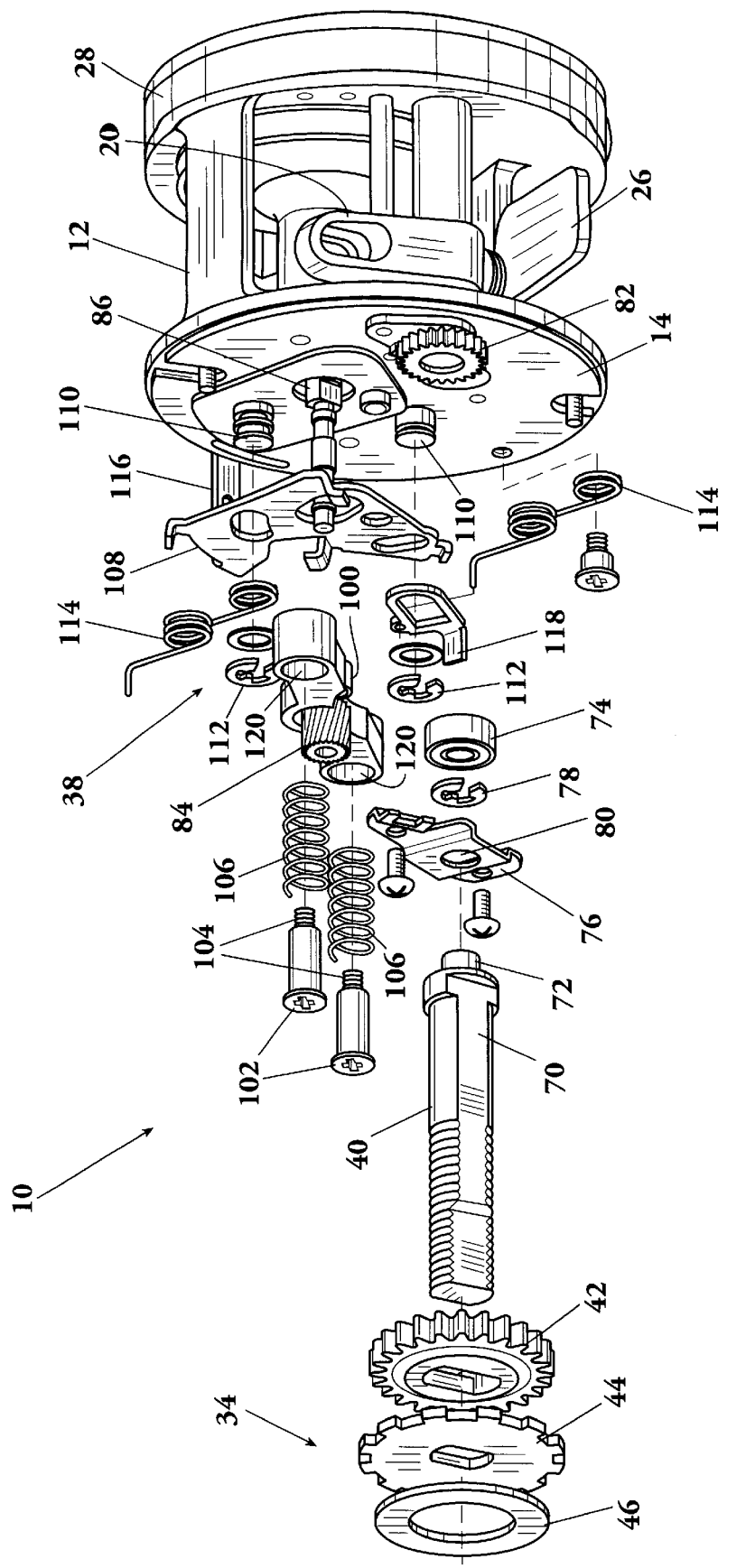

FIG. 2 provides an exploded view of the right hand side of inventive reel 10. The components and structure positioned on the right hand side of inventive reel 10 include: a crankshaft assembly 34; a spool tensioning assembly 36; and a casting actuator assembly 38. Crankshaft assembly 34, spool tensioning assembly 36, and actuator assembly 38 are each of a type commonly used in the art.

Crankshaft assembly 34 preferably comprises a crankshaft 40 having thereon: a level wind gear 42; a trip rachet 44; a first friction washer 46; a drive gear 48; a second friction washer 50; a drag washer 52; a washer 54; a clutch 56 retained in an open boss 58 projecting from right side cover 12; a clutch sleeve 60 received in clutch 56; a pair of exterior drag washers 62; a washer 64; a drag star 66; and a spring washer 68. Crank handle 24 is secured on the exterior end of crankshaft 40 by the inventive fastener 32 and inventive retainer 30. To ensure that level wind gear 42, trip rachet 44, clutch sleeve 60, spring washer 68, and drag washers 52 and 62 are constrained to always rotate with crankshaft 40, these components are keyed onto flat surfaces 70 formed on crankshaft 40.

As part of the drag system used in reel 10, drive gear 48 is not keyed onto the crankshaft 40. Instead, drive gear 48 is caused to rotate with crankshaft 40 as a result of being clamped between trip rachet 44 and drag washer 52. The drag system thus permits an adjustable degree of rotational slippage of drive gear 48 on crankshaft 40 such that, when an excessive pulling force is applied to the fishing line, a sufficient amount of additional line is released to prevent the line from breaking.

The amount of clamping/drag force applied to drive gear 48 can be selectively adjusted by turning drag star 66. Drag star 66 is threadedly received on the exterior end of crankshaft 40 such that, by turning drag star 66 clockwise, an increased clamping/drag force is applied to drive gear 48. Alternatively, the clamping/drag force applied to drive gear 48 can be reduced by turning drag star 66 counter clockwise.

To allow rotational movement of crankshaft 40, the interior end 72 thereof is positioned in a bearing 74. A retainer 76 holds bearing 74 to right side plate 14. In order to ensure that interior end 72 is retained in bearing 74 and to prevent crankshaft 40 from moving longitudinally, an E-clip 78 is used to retain interior end 72 in an aperture 80 provided through retainer 76. As will be understood by those skilled on the art, E-clip 78 clips into a shallow groove (not shown) provided around the exterior of end 72.

Level wind gear 42 operably engages a worm shaft gear 82 positioned adjacent right side plate 14. Gear 82 is attached to the end of a worm shaft rotatably contained within the level wind mechanism. As will be understood by those skilled in the art, worm shafts are commonly used in level wind mechanisms to cause the mechanism to move back and forth across the line spool during winding.

The drive gear 48 included in crankshaft assembly 40 operably engages a pinion gear 84 provided on the end of spool shaft 7. As a result of the operative engagement of gear 40 and 84, the user can rotate line spool 18 by turning crank handle 24.

Spool tensioning assembly 36 is operable for adjusting the amount of retaining stress applied to the ends of spool shaft 86 in order to regulate, to some degree, the rotational freedom of line spool 18. Spool tensioning assembly 36 comprises: a tension boss 88 having its inner end pressed into an aperture 90 provided through the wall of right side cover 22; an O-ring 92 positioned around the outer portion of tension boss 88; a bearing 94 positioned in boss 88 for receiving the end of spool shaft 86; a pair of spool washers 96 positioned on bearing 94; and a tension knob 98 threadedly received on tension boss 88. Due to the threaded attachment of tension knob 98 to tension boss 88, the amount of tension applied to the ends of spool shaft 7 can be increased by manually turning tension knob 98 clockwise.

Preferably, casting actuator assembly 38 comprises: a pinion yoke 100 for moving pinion gear 84 longitudinally on spool shaft 86; a pair of elongate retainers 102 attached to right side plate 14 by means of threaded ends 104; a pair of biasing springs 192 held by retainers 102 for biasing pinion yoke 100 and pinion gear 84 toward side plate 14; a release slider 108 pivotably retained by guideposts 110 and E-clips 112; a pair of torsion springs 114 attached between slider 108 and side plate 14 for biasing slider away from engagement with pinion yoke 100; a thumb lever 116 extending from release slider 108; and a kick lever 118 provided on release slider 108 for engaging crankshaft trip rachet 44. Elongate retainers 102 are received through yoke apertures 120 such that yoke 100 will slide on retainers 102 toward and away from right side plate 14.

Figure 4:
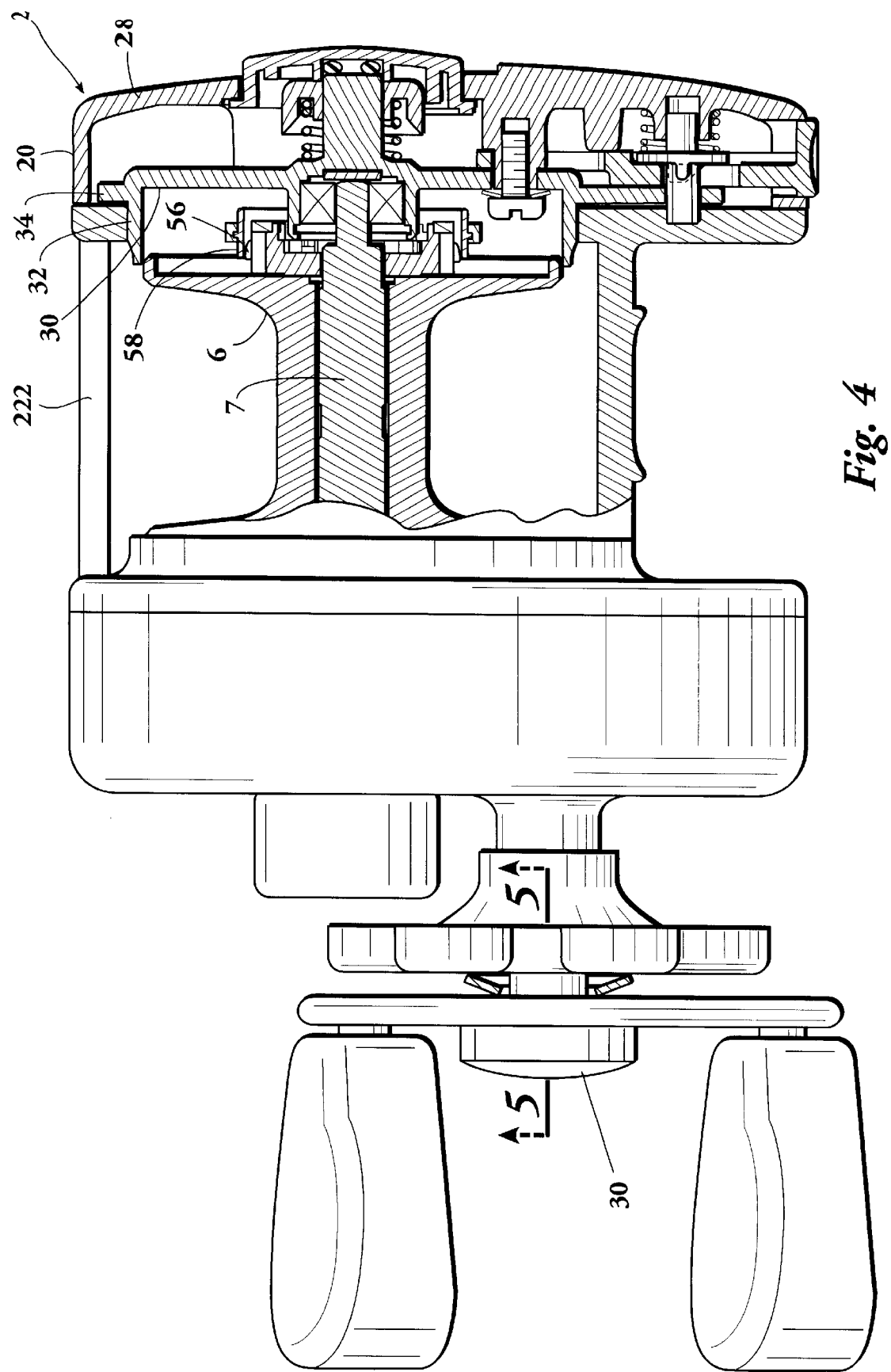
FIG. 4 provides a partial elevational front view of the inventive reel.

Turning now to a detailed description of the instant invention, as best seen in FIGS. 3–4, the preferred embodiments of the inventive fastener and retainer apparatus preferably comprise an inventive nut 32 and an inventive retainer 30. The nut 32 includes: an internal thread 122 for threadedly attaching the nut 32 to the crankshaft 40; a distal end 124; a hexagonal outside perimeter 126 opposite the distal end 124 for gripping the nut 32 with conventional tools; and an outward flare 128 with a substantially circular perimeter, at the distal end 124. Although the nut described above has a hexagonal profile for gripping, it will be apparent to those skilled in the art that there are many profiles which would provide the desired functions such as a square, an octagonal, or a splined profile. As used hereinafter, the term "nut" will be used in its broadest sense to include any threaded fastener with a shape that facilitates gripping it with a tool.

The retainer 30 is preferably formed or machined from an elastic material. As used herein, elastic materials include any material with sufficient elastic properties to allow temporary deformation of the retainer 30 for reasons discussed below. By way of example and not limitation, plastic materials include polyethylene metals, polycarbonate, polystyrene, natural rubber compounds, urethane, and other elastomeric compounds.

The retainer 30 preferably includes: a first interior cavity 130; a second interior cavity 132; a third interior cavity 134; a fourth interior cavity 136; a boss 138; and a smooth exterior surface 140.

The first interior cavity 130 is shaped to captivate the nut 32. In the preferred embodiment, the perimeter of the cavity 130 is defined by a series of twenty-four equal length line segments 142 creating a twelve point star 144 which is centered about an axis 146. The star 144 is preferably sized such that every other point of the star 144 will receive a corner of the hexagonal portion of the nut 32 thereby nonrotatably fixing the retainer 30 to the nut 32. The twelve points provide alignment between the retainer 30 and the nut 32 in rotational increments of thirty degrees.

The second interior cavity 132 is shaped to receive the flared end 128 of the hex nut 32. The second interior cavity 132 preferably has a substantially circular perimeter 148 and an inside wall 150, axially aligned with the first interior cavity 130 about axis 146. The inside wall 150 tapers such that the circular perimeter 148 has an increasing circumference, towards the closed end of the cavity. The size of the narrow end of the cavity 132 is slightly smaller than the large end of the flare 128 on the nut 32 such that the retainer 30 must be temporarily deformed to receive the flared portion of the nut 32 into the second interior cavity 132. Once the retainer 30 is-snapped into place over the nut 32, the first interior cavity 132 prevents rotational movement between the retainer 30 and the hex nut 32, the second cavity 132 prevents axial movement. The retainer 30 may be removed from the nut 32 by temporarily deforming the retainer 30.

The third and fourth interior cavities 134 and 136 are provided primarily to accommodate the formation of the retainer 30 using a standard molding process. The third and fourth interior cavities 134 and 136 give retainer 30 a more consistent thickness profile and thereby enhance the dimensional stability and minimize distortion of the retainer 30 during the cooling cycle of the molding process.

The boss 138 projects from the fourth interior cavity 136 and is matingly received in a hole 152 in the crank handle 24. When the retainer 30 is snapped onto the nut 32, the boss 138 is received in the hole 152 thereby preventing rotation between the retainer 32 and the crank handle 24 and rotationally fixing the crank handle 24, the nut 32 and the retainer 30 together.

The smooth exterior surface 140 is provided to discourage the collection of contaminates and to reduce the risk of entanglement of the instant device with the fishing line.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. For example, the crankshaft could be provided with an inside thread and a screw could be used in place of a nut for the inventive fastener. As a further example, the boss could extend from the crank handle and be received by a recess in the retainer. Such changes and modifications are encompassed within the spirit of this invention as defined by the appended claims.

What is claimed is:

1. A fastener and retainer apparatus comprising:
   a nut having at least one gripping surface and a retaining shoulder, said retaining shoulder flaring from a first cross sectional area to a second cross sectional area; and
   a deformable retainer including:
      a longitudinal end;
      a first cavity in said longitudinal end having a shape to receive said gripping surface such that said nut is prevented from rotating relative to said retainer;
      a second cavity flaring from a third cross sectional area to a fourth cross sectional area, said retaining shoulder receivable in said second cavity to releasable attach said deformable retainer onto said nut, wherein,
      when said retainer is releasably attached to said nut, said third cross sectional area mates with said first cross sectional area and said fourth cross sectional area mates with said second cross sectional area,
      said third cross sectional area is smaller than said second cross sectional area, and
      said third cross sectional area must traverse said second cross sectional area to mate with said first cross sectional area, requiring temporary deformation of said deformable retainer and thereby retaining said deformable retainer on said nut.

2. The fastener and retainer apparatus of claim 1 wherein said gripping surface has a hexagonal cross sectional shape.

3. The fastener and retainer apparatus of claim 1 wherein said retainer is molded from a material selected from the group consisting of:
   urethane;
   natural rubber;
   polyethylene; and
   synthetic rubber.

4. The fastener and retainer apparatus of claim 1 wherein said first cavity has a cross sectional shape of a twelve point star.

5. A fishing reel comprising:
   a crankshaft having a distal end;
   a crank handle having a surface and a recess in said surface;
   a nut having an inner portion and an outer portion, said inner portion comprising at least one gripping surface and said outer portion comprising a retaining shoulder flaring outwardly from a first cross sectional area adjacent said gripping surface to a second cross sectional area;
   a deformable retainer including:
      a longitudinal end;
      a first cavity in said longitudinal end having a shape to receive said gripping surface such that said nut is prevented from rotation relative to said retainer;
      a second cavity extending longitudinally from said first cavity said second cavity having an outwardly flared shape such that said retaining shoulder is receivable in said second cavity wherein said deformable retainer must be temporarily deformed to receive said retaining shoulder in said second cavity and said deformable retainer must be temporarily deformed to release said retaining shoulder from said second cavity; and
   a boss protruding from said longitudinal end, said boss receivable in said recess;
   wherein, when said crank handle is nonrotatably secured to said distal end of said crankshaft by said nut, said inner portion being adjacent said surface, and said nut is received in said deformable retainer said boss will be received in said recess thereby preventing relative rotation between said nut and said crankshaft.

6. The fishing reel of claim 5 wherein said gripping surface of said nut has a hexagonal cross sectional shape.

7. The fishing reel of claim 5 wherein said retainer is molded from a material selected from the group consisting of:
   urethane;
   natural rubber;
   polyethylene; and
   synthetic rubber.

8. The fishing reel of claim 5 wherein said first cavity has a cross sectional shape of a twelve point star.

9. A deformable retainer for releasably receiving a fastener having a flared retaining shoulder and a gripping surface comprising:
   a longitudinal end;
   a first cavity in said longitudinal end, said cavity having a shape to receive the gripping surface of the fastener such that the fastener is prevented from rotating relative to said deformable retainer;
   a second cavity extending from said first cavity, said second cavity having a flared shape for receiving the flared retaining shoulder of the fastener, wherein said deformable retainer must be temporarily deformed to receive the flared retaining shoulder in said second cavity and said deformable retainer must be temporarily deformed to release said retaining shoulder from said second cavity; and
   a boss protruding longitudinally from said longitudinal end.

* * * * *